United States Patent
Saux et al.

(10) Patent No.: US 6,349,835 B1
(45) Date of Patent: Feb. 26, 2002

(54) WATER TREATMENT INSTALLATION

(75) Inventors: Franc Saux, Sainte Foy D'Aigrefeuille; Jean-Michel Espenan, Deyme; Jean-Claude Bontemps, Gif sur Yvette, all of (FR)

(73) Assignee: Polymem, Fourquevaux (FR)

(*) Notice: Subject to any disclaimer, the term of this patent is extended or adjusted under 35 U.S.C. 154(b) by 0 days.

(21) Appl. No.: 09/743,716
(22) PCT Filed: Jul. 15, 1999
(86) PCT No.: PCT/FR99/01726
§ 371 Date: Jan. 16, 2001
§ 102(e) Date: Jan. 16, 2001
(87) PCT Pub. No.: WO00/03792
PCT Pub. Date: Jan. 27, 2000

(30) Foreign Application Priority Data

Jul. 17, 1998 (FR) .............................. 98 09141

(51) Int. Cl.⁷ .................. B01D 65/02; B01D 61/08; B01D 61/20; B01D 61/02; B01D 61/58
(52) U.S. Cl. .................. 210/427; 210/194; 210/195.1; 210/195.2; 210/252; 210/253; 210/257.2; 210/258; 210/295; 210/321.69; 210/418; 210/420; 210/424; 210/425; 210/433.1
(58) Field of Search .............. 210/194, 195.1, 210/195.2, 252, 253, 257.2, 258, 295, 321.69, 418, 420, 424, 425, 427, 433.1

(56) References Cited

U.S. PATENT DOCUMENTS 4,724,079 A  2/1988 Sale et al.

FOREIGN PATENT DOCUMENTS

| DE | 39 14 940 A1 | 11/1990 |
| DE | 295 07 367 U1 | 2/1996 |
| DE | 195 20 913 A1 | 12/1996 |
| EP | 0 540 485 A1 | 5/1993 |
| GB | 2 303 316 | 2/1997 |

OTHER PUBLICATIONS

Patent Abstracts of Japan, vol. 005, No. 188, Nov. 27, 1981, JP 56 111006A, Sep. 2, 1981.

*Primary Examiner*—John Kim
(74) *Attorney, Agent, or Firm*—Larson & Taylor PLC

(57) ABSTRACT

The invention concerns a water treatment method and installation, which consist in subjecting the water to be treated to membrane filtration (1) to satisfy the requirement for a relatively high flowrate of water for ordinary use (UF), subjecting the water that has been subjected to membrane filtering to reverse osmosis filtering (2) to satisfy the requirement for a smaller flowrate of water of improved quality (OS) and, outside periods of production of water filtered by reverse osmosis, sweeping the upstream face of the osmosis membrane (9) with the flow of membrane-filtered water drawn off to be consumed.

8 Claims, 3 Drawing Sheets

WATER TREATMENT INSTALLATION

Figure 1:
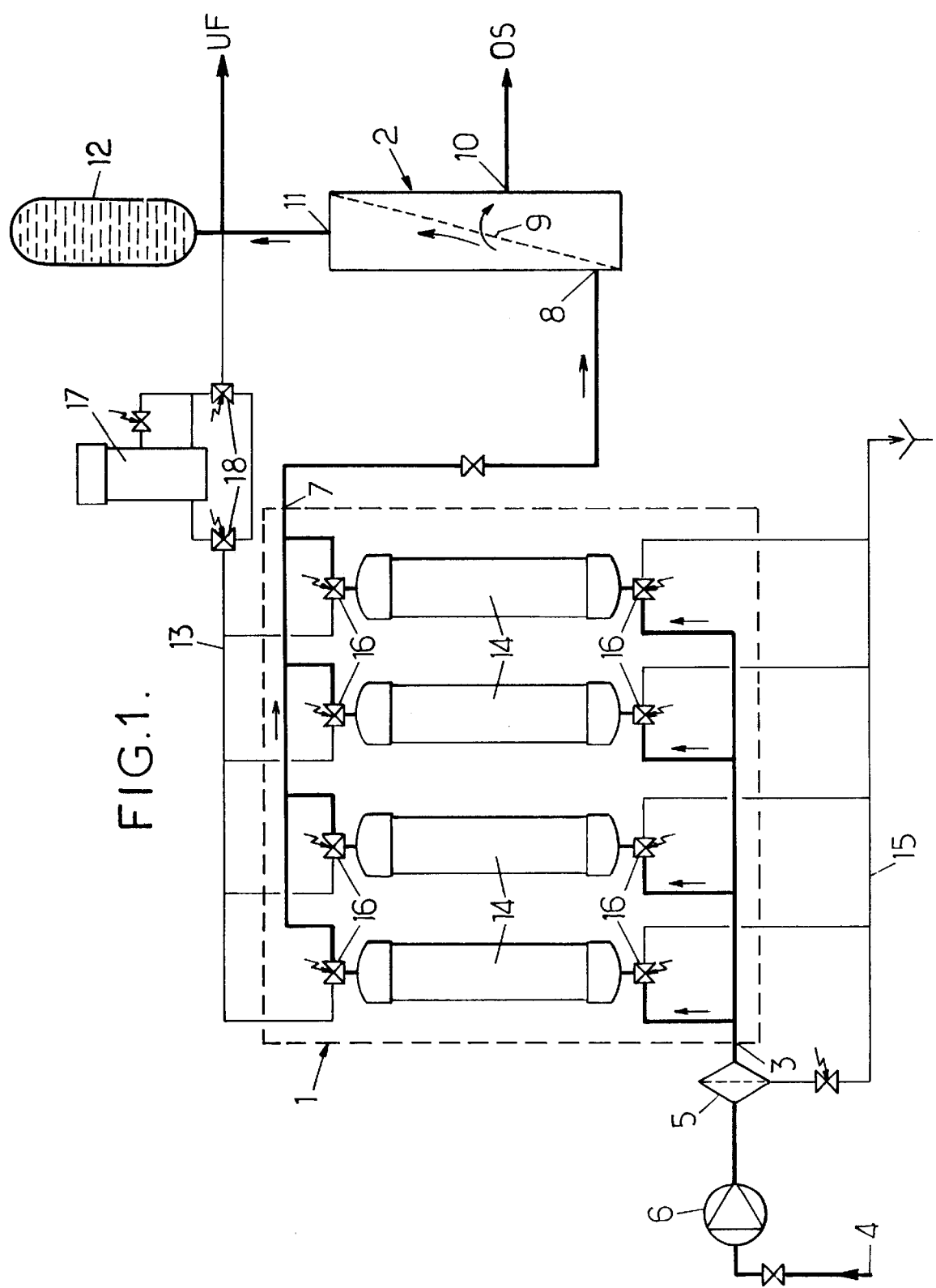

The present invention concerns improvements to installations for treating water, in particular drinking water for domestic use whose quality complies with standardised characteristics that it may be desirable to improve on further, for example on an individual basis, which installations are constituted as set out in the preamble of claim 1.

Various methods are known at present using membranes to treat and purify water.

A first group of methods comprises microfiltration and ultrafiltration (referred to generically hereinafter as "membrane filtration") respectively using membranes able to block bodies having dimensions up to 0.1 micron and up to 0.01 micron (for example filter viruses): these methods are respectively used to clarify water and to clarify and disinfect water. However, they cannot eliminate small organic or mineral molecules (salts) and further treatment may be required to obtain water of improved quality.

Membrane filtration operates at a low pressure and enables high flowrates of clarified and disinfected water to be obtained economically. The membranes are cleaned periodically by passing filtered water through them in the reverse flow direction, generally with an oxidising agent added (chlorine, hydrogen peroxide, etc.). The filtered water required for cleaning is stored beforehand in a tank and pumped back in the reverse flow direction or obtained directly from the filter modules during the operation.

Another group of methods comprises reverse osmosis and nanofiltration (referred to generically hereinafter as "reverse osmosis") which partly or totally eliminate small molecules and which can therefore claim to produce drinking water of improved quality. However, these methods can treat only small flowrates of water and are carried out at a high pressure: it is therefore not feasible to satisfy economically all ordinary requirements for drinking water with water treated by osmosis, in particular in an individual dwelling.

It is known that it is necessary to eliminate all particles and colloids in the water before it enters an osmosis treatment unit so as not to clog the unit irreversibly. It is also necessary to sweep the surface of the osmosis membrane to limit the concentration of species retained on the surface, too high a concentration leading to a significant drop in the rejection rate and permeability. Sweeping is often done with lost water, which leads to high water consumption.

The document DE-A-39 14 940 describes a water treatment installation in accordance with the preamble of claim 1. However, in the prior art installation, the filter means on the upstream side of the osmosis filter unit achieve insufficient filtration of the water supplying the osmosis filtered unit and the membrane thereof can clog quickly. Moreover, in an installation of the kind concerned, most of the filtered water consumed is water delivered by the first filter unit, which in the system described in the document concerned is not suitable for providing-the required flowrate of filtered water quasi-instantaneously. Finally, the installation is such that the first-filtered water and osmosis-treated water can selectively take the same portions of flow pipes, which raises the problem of pollution of the osmosis-treated water finally distributed.

The document DE-A-195 20 913 concerns an installation for producing osmosis-treated water for supplying a haemodialysis unit, in which there is on the upstream side of the osmosis filter unit a preliminary filter which can be cleaned by circulation of water in the reverse direction. However, in this prior art installation the preliminary filter can only perform coarse filtering and the water supplied to the osmosis filter unit, being insufficiently filtered, clogs the osmosis membrane very quickly. Moreover, in the prior art installation there is also the risk of contamination of the osmosis-treated water by the water that has merely undergone preliminary filtering, and the quality of the osmosis-treated water delivered may not be strictly reliable at all times.

An essential object of the invention is therefore to remedy at least some of the drawbacks of the prior art and to propose an original solution which satisfies the various practical requirements.

To this end, the invention proposes a water treatment installation as mentioned in the preamble and which is characterised by the features stated in the characterising part of claim 1.

By virtue of this improved system, the osmosis filter unit is supplied with water that has already been highly filtered by the membrane filter unit, which can advantageously be an ultrafiltration unit: the osmosis membrane therefore becomes clogged more slowly and can be cleaned effectively by circulating membrane filtered water drawn off to be consumed over its upstream surface, even if the consumption of membrane filtered water is intermittent.

Moreover, installing a reserve tank on the membrane-filtered water outlet circuit accelerates the supply of a sufficient flowrate of membrane-filtered water and allows backwashing of the membrane filter unit.

Finally, in the system according to the invention, the circuit for circulating the water for backwashing the membrane filter unit is entirely separate from the circuit supplying the osmosis filter unit and necessarily has no common point with the osmosis-treated water distribution circuit: this optimises the reliability of the production of osmosis-treated water, with no possibility of it being polluted with membrane-filtered water.

In one practical embodiment, the cleaning circuit can include a cleaning product storage tank that is in parallel with said first pipe and can be selectively inserted into the first pipe. What is more, it is advantageous for the membrane filter unit to include at least three membrane filter modules in parallel to ensure permanent availability of water at the outlet whilst providing for the maintenance and cleaning cycles.

To facilitate the operation of the installation, each end of each membrane filter module is advantageously equipped with a selection valve adapted to command in said membrane filter module a flow of water in the forward direction (filtering) or in the reverse direction (cleaning) and includes valve control means such that two membrane filter modules in parallel supply filtered water to the third module for cleaning it.

To improve the equipment of the installation, a device for coarse filtering of the water to be treated and/or a booster pump can be provided on the upstream side of the membrane filter unit.

Figure 2:
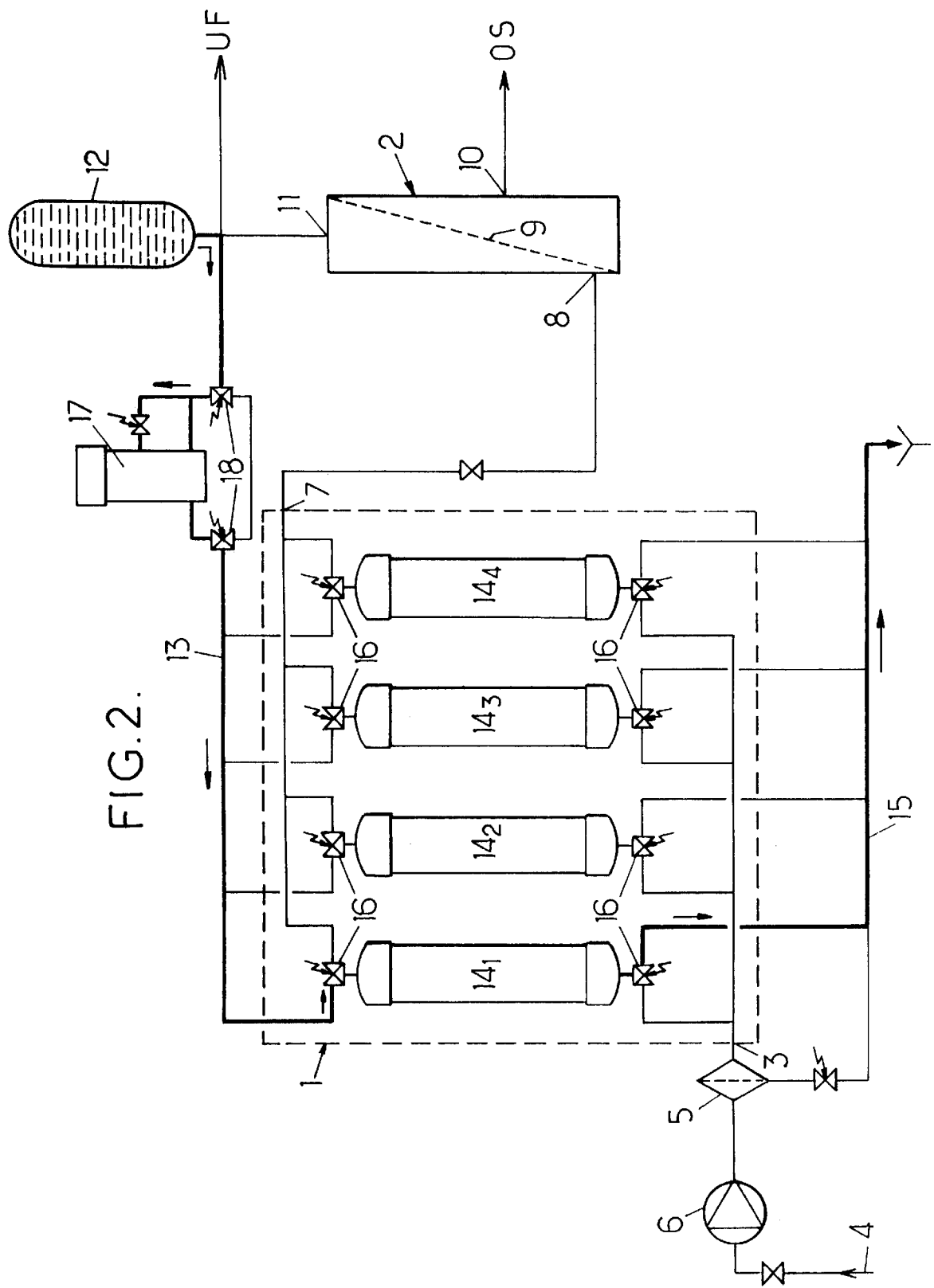
Figure 3:
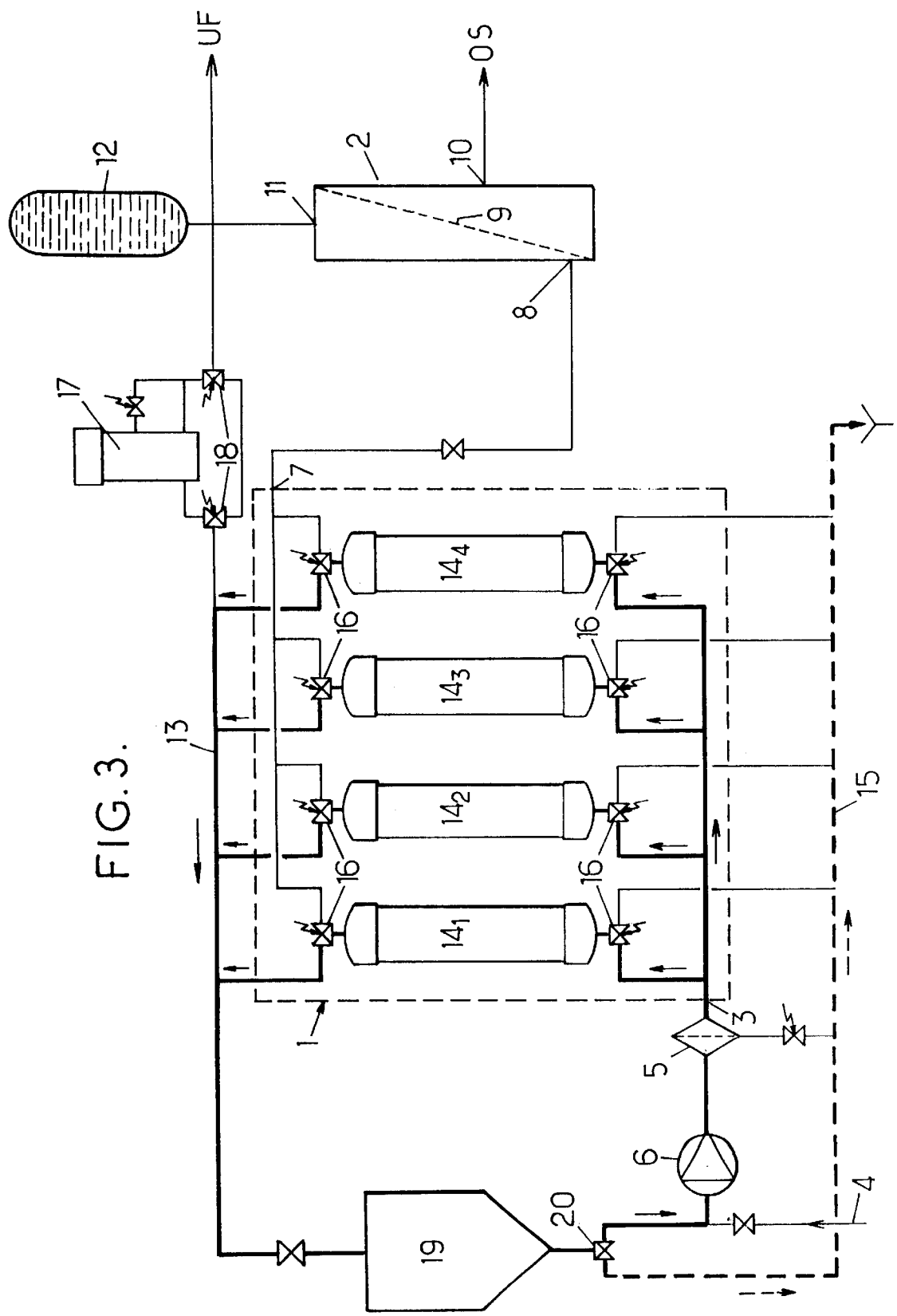

The invention will be better understood after reading the following detailed description of a preferred embodiment, which is given by way of non-limiting example only. The description refers to the accompanying drawings in which FIGS. 1 to 3 are simplified diagrams of an installation according to the invention shown in various functional configurations.

The installation shown in FIG. 1 essentially includes a membrane filter unit 1 in series with a reverse osmosis filter unit 2.

The membrane filter unit 1 has an inlet 3 for water to be treated connected to a water supply 4 (for example a supply of drinking water from a distribution network), preferably via a coarse preliminary filter 5 and possibly, if the pressure of the water supply 4 is insufficient, via a booster pump 6.

The membrane filter unit 1 can be of any appropriate type and have any required conformation. It is preferably of the ultrafiltration type and is made up of a plurality of modules in parallel (four are shown in the drawing) for a reason that will be indicated below.

The outlet 7 for membrane-filtered water (in this instance ultrafiltered water) from the unit 1 is connected to the inlet 8 of the reverse osmosis filter unit 2. The inlet 8 is upstream of at least one osmosis membrane 9 contained in the unit 2.

The unit 2 has an outlet 10 downstream of the osmosis membrane 9 delivering water that has been subjected to reverse osmosis filtering (osmosis-treated water OS).

Finally, the unit 2 has another outlet 11 upstream of the osmosis membrane 9 and delivering membrane-filtered water (UF) that has not been subjected to reverse osmosis filtering.

In this installation all -membrane-filtered water UF drawn off to be consumed is obliged, after leaving the membrane filter unit 1, to pass through the reverse osmosis filter unit 2 and to flow over the upstream side of the osmosis membrane 9 (the inlet 8 and the outlet 11 are preferably at opposite ends of the membrane 9). Consequently, the upstream face of the membrane 9 is swept and cleaned by the flow of membrane-filtered water each time that membrane-filtered water is drawn off to be consumed. The osmosis membrane is sure to be in a satisfactory state of cleanliness at all times because the membrane-filtered water is drinking water for ordinary use, which the installation can deliver at a high flowrate (the number of membrane filter modules is determined accordingly).

As for the osmosis-treated water OS delivered by the reverse osmosis unit 2, it is a fact that it is supplied at a low flowrate, because this is inherent to the reverse osmosis process, but this is no particular inconvenience as this drinking water of improved quality is used in small quantities.

The above arrangement distributes filtered drinking water in a manner appropriate to what is required, and the osmosis membrane is kept operational automatically and at all times exclusively by virtue of the drawing off for consumption of UF water delivered by the membrane filter unit.

In FIG. 1 the bold line shows the circuit of the water from the inlet 4 to the UF and OS outlets.

To facilitate operation of the installation, and to prevent the membrane filter unit 1 from starting up, even if a small quantity of UF or OS water is drawn off, a tank 12 forming a buffer of membrane-filtered water UF is connected to the outlet 11 of the osmosis filter unit 2.

For the rest, the installation can be adapted in any appropriate manner to obtain correct operation, in particular with regard to cleaning and inspecting it periodically.

In particular, in the ultrafiltration method, the ultrafiltration membranes need to be cleaned regularly by a reverse flow of ultrafiltered water at a high pressure (backwashing). This requirement leads in practice to constructing the unit with a plurality of ultrafiltration modules in parallel which can be isolated from each other so that a module to be cleaned can be fed with a reverse flow of ultrafiltered water at a high pressure (and therefore at a high flowrate) supplied by one or preferably two modules operating in the reverse direction, and possibly at the same time as another module remains available for drawing off UF water to be consumed.

Thus in practice the membrane filter unit comprises at least two modules in parallel (in which case it is impossible to supply the water consumed during the cleaning phase), advantageously with three modules and preferably with four modules, the latter situation being shown in FIG. 1.

Note that the tank 12 has an important function during cleaning of the modules, either because it alone supplies the UF water for consumption if no module is available for supplying it or contributes to supplying the water for cleaning a module.

This being the case, an auxiliary cleaning circuit 13 is used, connected to the outlet 11 of the osmosis filter unit 2 at one end and to the outlet side of the various modules 14 of the membrane filter unit 1 at the other end. The inlet sides of the various modules are all connected at 15 to a drain.

To make the various selective interconnections between the modules and/or between the modules and the remainder of the installation, each module has at each end a two-way valve 16 selecting either the direct flow pipe (filtration) or the reverse flow pipe (cleaning); valve control means (not shown) ensure that two filter modules 14 in parallel supply filtered water to a third module for cleaning it.

Because the modules are cleaned with brine, the cleaning circuit 13 is associated with a brine generator 17 incorporating a salt hopper. The brine generator 17 is in parallel with the circuit 13 and can be selectively inserted into the circuit 13, for example by upstream and downstream solenoid valves 18.

FIGS. 2 and 3 show one example of a method of cleaning one of the modules $14_1$, supplied with water in the reverse flow direction by two modules $14_2$ and $14_3$ in parallel, the fourth module $14_4$ remaining available to satisfy any demand for UF water.

Referring first to FIG. 2, the phase of chlorinated cleaning of the module $14_1$ using brine consists of taking UF water from the tank 12 at a constant flowrate and passing it through the generator 17 so that it becomes charged with salt (for example sodium chloride). By exciting an electrode in the circuit 13, the brine is converted into chlorinated water and passes through the module 14 in the reverse flow direction, after which it is discharged to the drain. After a particular time period the generator 17 is bypassed and the UF water is passed in the reverse flow direction into the module $14_1$ to rinse the circuit and the module (in particular to eliminate traces of chlorine).

FIG. 3 shows a phase of chemical cleaning of all the modules 14. A tank 19 containing a washing product is connected to the pump 6 which circulates the cleaning liquid in the forward flow direction in the modules 14, after which the cleaning product is returned to the tank via the line 13 (bold solid line in FIG. 3). Once the cleaning cycle has been completed, a solenoid valve 20 at the outlet of the tank directs the cleaning product in the line 15 to the drain (bold dashed line in FIG. 3). At the end of the cycle the system is rinsed by having the pump 6 circulate water to be treated taken from the supply 4 through the modules 14 and then evacuating the membrane-filtered water obtained in this way to the drain via the line 13, the tank 19 and the line 15.

Note that the chlorinated water cleaning cycle described above with reference to FIG. 2 entails circulating membrane-filtered water taken from the outlet 11 of the osmosis filter unit or from the tank 12. In either case, the water has beforehand swept the upstream face of the osmosis membrane 9. Thus the osmosis membrane is cleaned not only by the membrane-filtered water drawn off from the outlet for everyday consumption at the exterior of the enclosure, but also by the membrane-filtered water circulated during the chlorinated cleaning cycle, which multiplies the phases of cleaning the osmosis membrane.

Of course, the installation can include other units and/or functional cycles needed for it to operate reliably but which have no direct effect on the subject matter of the invention and are not described here (for example, a test on the integrity of the membranes of the modules 14 using compressed air, purging/rinsing cycles, preliminary filter 5 cleaning cycle, etc.).

Similarly, some cycles, such as the cleaning cycle, have been described above by way of example in a reverse flow arrangement. However, other operating modes are feasible (for example circulation of chlorinated water in the forward flow direction).

In the final analysis, the use of the invention brings many advantages:

- use of membrane-filtered water to sweep the upstream face of the osmosis membrane frequently and at a high flowrate, leading to a saving in terms of the water required for such cleaning;
- sweeping of the upstream face of the osmosis membrane by all of the membrane-filtered water used both for consumption and for maintenance of the installation, which increases the sweeping volume and frequency;
- use of a membrane-filtered water reserve tank as a buffer and to prevent the installation starting up if a small quantity of membrane-filtered water or osmosis-treated water is drawn off;
- separation of the distribution circuits downstream of the membrane filter unit, according to the respective production capacities of the membrane filter unit and the osmosis filter unit, so reducing the size and cost of the installation;
- easy adaptation of operating sequences of the installation to requirements;
- easy automation of operation of the installation regardless of the number and the nature of its functions, including maintenance of the osmosis filter unit.

What is claimed is:

1. A water treatment installation including:
   a supply of water to be treated,
   a membrane filter unit (1) having an inlet (3) connected to said supply (4) of water to be treated and an outlet (9),
   a reverse osmosis filter unit (2) including at least one osmosis membrane (9) and having:
      a first-filtered water inlet (8) which is connected to the outlet (7) of said membrane filter unit (1) and located upstream of said osmosis membrane (9),
      an osmosis-treated water outlet (10) which is located downstream of said osmosis membrane (9) and connected to an osmosis-treated water outlet (OS) of the installation,
      a first-filtered water outlet (11) which is located upstream of the osmosis membrane (9) and connected to a first-filtered water outlet (UF) of the installation,
      said first-filtered water inlet (8) and outlet (11) of the reverse osmosis filter unit (2) being disposed so that the flow of first-filtered water drawn off to be consumed at the first-filtered water outlet of the installation flows from said inlet (8) to said outlet (11) through the reverse osmosis filter unit (2) on the upstream side of the osmosis membrane (9) and sweeps the upstream face of the osmosis membrane, characterised in that the first filter unit is a membrane filter unit (1) including at least two filter modules (14) in parallel each having an inlet for water to be treated connected to said inlet (3) of the membrane filter unit (1) and a treated water outlet connected to said outlet (7) of the membrane filter unit (1), and in that the installation further includes:
      a circuit for individually cleaning the modules of the membrane filter unit by circulating membrane-filtered water from said outlet (11) of the reverse osmosis filter unit, (2) in the reverse flow direction, which cleaning circuit includes a first circuit (13) between the membrane-filtered water outlet of the reverse osmosis filter unit (2) and the respective outlets of the modules (14) of the membrane filter unit (1) and a second circuit (15) connecting the respective inlets of the modules (14) of the membrane filter unit (1) to a common drain, and
      respective selector means (16) at the inlet and the outlet of each module (14) adapted to assure selectively for each module (14) either a connection in the forward flow direction between the inlet (3) and the outlet (7) of the membrane filter unit (1) or a connection in the reverse flow direction between the first circuit (13) and the second circuit (15) of the cleaning circuit.

2. An installation according to claim 1, characterised in that it includes a membrane-filtered water storage tank (12) between the membrane-filtered water outlet (11) of the reverse osmosis filter unit (2) and the membrane-filtered water outlet of the installation.

3. An installation according to claim 1, characterised in that the cleaning circuit includes a cleaning product storage tank (17) which is in parallel with said first circuit (13) and can be selectively inserted (8) into the first circuit (13).

4. An installation according to claim 1, characterised in that the membrane filter unit (1) includes at least three membrane filter modules (14) in parallel.

5. An installation according to claim 4, characterised in that it includes control means for the selector means (16) such that two membrane filter modules in parallel supply filtered water to the third module for cleaning it.

6. An installation according to claim 1, characterised in that the membrane filter unit is an ultrafiltration unit.

7. An installation according to claim 1, characterised in that a device (5) for coarse filtering of the water to be treated is provided on the upstream side of the membrane filter unit.

8. An installation according to claim 1, characterised in that a booster pump (6) is provided on the upstream side of the membrane filter unit.

* * * * *